United States Patent
Wallentin et al.

(10) Patent No.: US 6,712,185 B2
(45) Date of Patent: Mar. 30, 2004

(54) DISK BRAKE UNIT FOR A VEHICLE WHEEL

(75) Inventors: Markus O. Wallentin, Gothenburg (SE); Thomas R. Svensson, Cologne (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/150,639

(22) Filed: May 17, 2002

(65) Prior Publication Data

US 2003/0047392 A1 Mar. 13, 2003

(30) Foreign Application Priority Data

May 18, 2001 (DE) .......................... 101 25 211

(51) Int. Cl.[7] .............................. F16D 65/10
(52) U.S. Cl. .............. 188/218 XL; 188/58; 188/218 R; 188/18 A; 188/264 G
(58) Field of Search ................ 188/71.1, 218 XL, 188/18 A, 264 G, 17, 26, 58, 218 R, 71.3, 71.5; 192/107 R, 113.4, 107 M

(56) References Cited

U.S. PATENT DOCUMENTS

| 3,146,860 | A | | 9/1964 | Wilson | |
|---|---|---|---|---|---|
| 3,621,945 | A | * | 11/1971 | Spry | .......................... 188/73.2 |
| 3,650,361 | A | * | 3/1972 | Fossum | ................ 188/218 XL |
| 3,780,834 | A | | 12/1973 | Lottridge et al. | |
| 3,788,429 | A | | 1/1974 | Brooks et al. | |
| 3,941,221 | A | | 3/1976 | Pringle | |
| 4,026,393 | A | * | 5/1977 | Gebhardt et al. | ..... 188/218 XL |
| 4,760,898 | A | | 8/1988 | Nyquist | |
| 4,913,266 | A | * | 4/1990 | Russell et al. | ............ 188/18 A |
| 5,005,676 | A | * | 4/1991 | Gassiat | ................. 188/218 XL |
| 5,137,123 | A | * | 8/1992 | Setogawa et al. | ..... 188/264 AA |
| 5,190,124 | A | * | 3/1993 | Haneda | ................ 188/218 XL |
| 6,223,863 | B1 | * | 5/2001 | Bunker | ..................... 188/18 A |

FOREIGN PATENT DOCUMENTS

| DE | 1 530 510 | 1/1965 |
|---|---|---|
| DE | 1 530 510 | 7/1968 |
| EP | 1128083 | 8/2001 |
| EP | 1091136 | 11/2001 |
| WO | WO98/25804 | 6/1998 |
| WO | WO 99/13239 | 3/1999 |
| WO | WO 00/42332 | 7/2000 |
| WO | WO02/29273 | 11/2002 |

OTHER PUBLICATIONS

Equipments De Chassis, M. Jean–Claude Girauldon, (1982), pp. 64–67.

* cited by examiner

*Primary Examiner*—Jack Lavinder
*Assistant Examiner*—Mariano Sy
(74) *Attorney, Agent, or Firm*—Brinks Hofer Gilson & Lione

(57) ABSTRACT

The invention relates to a disk brake unit for a vehicle wheel including a hub and a brake disk. The brake disk includes an outer ring and an inner ring, the inner ring and the outer ring being non-rotatably linked together. The outer ring includes a friction ring. The inner ring includes an internal surface with inner dogs for contacting a hub. The brake disk is adapted to prevent heat from being transmitted from the friction ring to the internal surface.

11 Claims, 3 Drawing Sheets

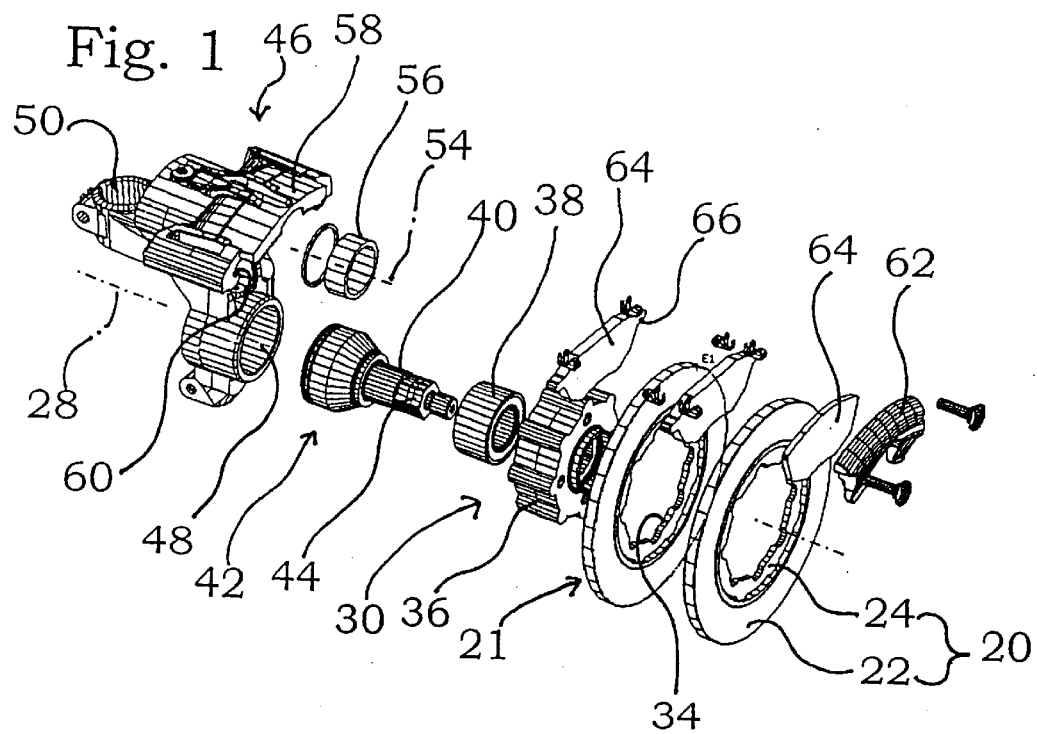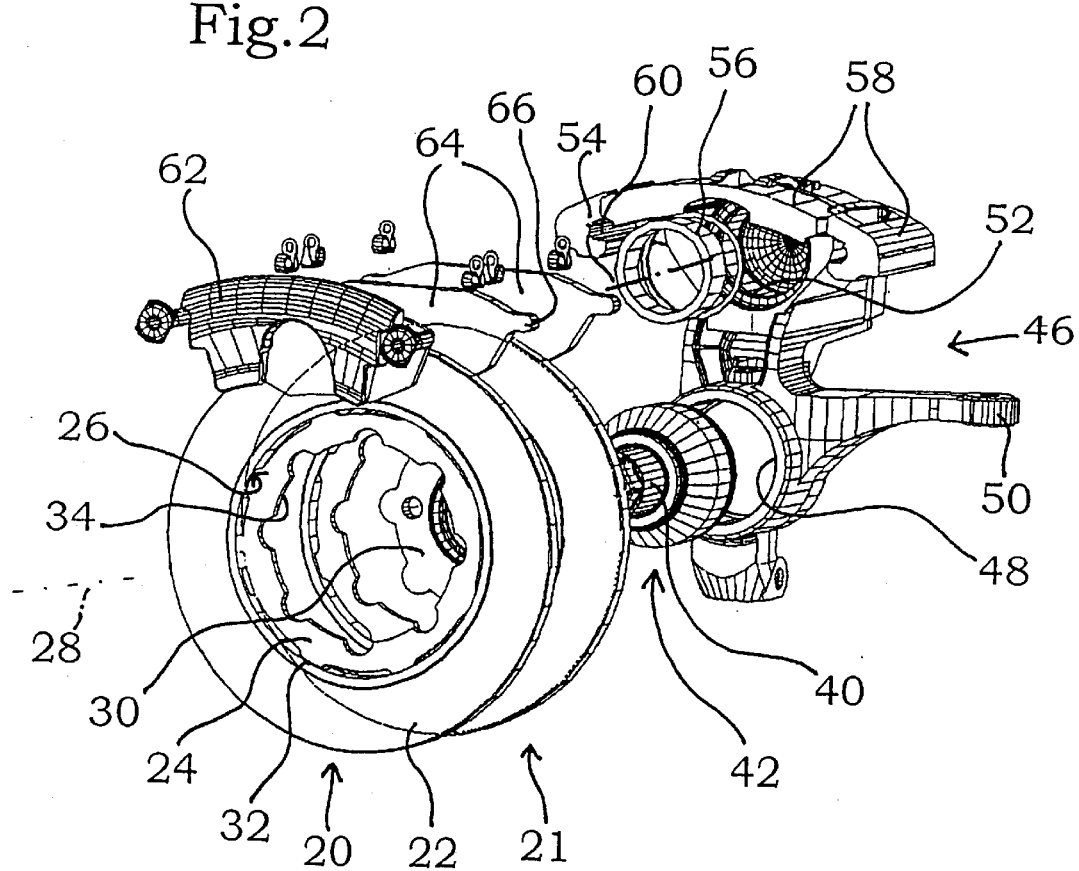

DISK BRAKE UNIT FOR A VEHICLE WHEEL

TECHNICAL FIELD OF THE INVENTION

The invention relates to a disk brake unit for a vehicle wheel. More specifically, the invention relates to a disk brake unit for a vehicle wheel with a hub having a rotational axis and with a brake disk which is slidable in the direction of the rotational axis but solidly connected to the hub both in circumferential and in radial direction, the hub having an external surface including outer dogs and the brake disk having an internal surface including inner dogs adapted to contact the external surface of the hub.

BACKGROUND OF THE INVENTION

The bearing and disk brake unit of this type is known in the art. The unit has a hub which is provided at least in parts on its external surface with intermeshing surface features. These features form the outer dogs. Two brake disks having an internal surface provided with corresponding intermeshing surface features are provided, said brake disks cooperating with the hub by way of said internal surface in such a manner that every single brake disk can be shifted relative to the hub in the direction of the rotational axis, but cannot be moved relative to the hub in the circumferential or radial direction.

When braking, high temperatures occur on a friction ring of the brake disk, the complete brake disk getting very hot as a result thereof. This means that the internal casing of the brake disk expands, which reduces the contact with the teeth of the external casing of the hub. This might result in a clearance between brake disk and hub in both circumferential and radial direction.

To prevent such a clearance from forming, the bearing and disk brake unit is provided with three relatively strong leaf springs that are offset on the circumference between internal and external surface, said leaf springs providing an elastic biasing force. However, said leaf springs reduce the axial slidability of the brake disk relative to the hub. Furthermore, high demands are placed on the leaf springs, they must resist high thermal loads. The three leaf springs of one hub must be sufficiently harmonized. The leaf springs must keep functioning for a relatively long useful life without appreciably deteriorating. Accordingly, with the prior art devices, the transition between the internal surface of the brake disk and the external casing of the hub has to meet many requirements. Even at high temperatures, the mechanical connection is to remain readily slidable in axial direction but mechanically so solid in circumferential and radial direction under the elastic biasing force that no rattling, clattering or any other kind of play occurs.

SUMMARY OF THE INVENTION

In view of the disk brake unit of the type mentioned herein above, it is the object of the invention to develop the brake disk in such a manner that the contact area between internal and external surface is less subject to thermal load and that elastic means may be dispensed with in said area.

In view of the disk brake unit of the type mentioned herein above, the solution to this object consists in providing the brake disk with an outer ring and with an inner ring, the inner ring and the outer ring being non-rotatably linked together. The outer ring having a friction ring. The inner ring having an internal surface with inner dogs for contacting a hub. Further, the brake disk having a means that prevents heat from being transmitted from the friction ring to the internal surface where the means is arranged between the friction ring and the internal surface.

In accordance with the invention, the heat built up on the friction ring of the brake disk is not directly forwarded to the internal surface of the brake disk, means being provided between friction ring and internal surface which greatly restrict the flow of heat toward the internal surface. As a result thereof, the hub and the parts associated thereto are relieved of the thermal load. The cooperation between internal surface and external surface is simplified and the accuracy of the engagement between the two surfaces improved. Elastic means may be dispensed with here. Thus, the gliding of the brake disks relative to the hub is not additionally hindered either.

The inner ring is also termed a sliding ring. Its function is to cooperate with the hub. It is designed to cooperate with the hub with the least possible play in circumferential and radial direction but to be readily slidable in axial direction. The outer ring is substantially formed by a friction ring. It is suitably connected to the inner ring. The means mentioned may hereby be provided in the connection region between inner ring and outer ring, but they may also be realized by the material of the inner ring, by a ceramic material of the inner ring for example.

The outer ring may be made of ceramics. The inner ring may be made from any other material. Since the ring is divided into an inner and an outer ring, it is possible to utilize different materials, each of them meeting the specific demands placed on the ring. This is a very important step in this field of disc brakes.

The invention makes it possible to considerably reduce the transmission of heat from the friction ring to the other parts of the disk brake unit. This reduces the wear altogether. A brake fluid with a lower boiling point may be utilized. The relative movements between different parts, as they are repeatedly caused to occur by thermal expansion and cooling, are reduced.

In a preferred embodiment of the invention, a ring, the inner ring for example, is provided with fingers which extend in radial direction. The other ring, the outer ring for example, has pockets which are radially accessible and into which the fingers engage. Movement between fingers and pockets is only possible in radial direction. Since the fingers and pockets mesh together, movement in circumferential and axial direction is not possible. But few fingers, and accordingly few pockets are needed to provide a sufficiently dimensioned mechanical connection between inner and outer ring. As a result thereof, the contact between inner and outer ring is reduced to very few contact surfaces. This again means that the transmission of heat from the outer ring to the inner ring is greatly restricted.

In another embodiment, the inner ring is made of a metal with a very low thermal conductivity, more specifically ceramics. The inner ring must not meet the mechanical requirements of a friction ring, it only needs to be sufficiently linked thereto and to be capable of being moved in axial direction. Inasmuch, the ceramics suited for the inner ring are different from those for the outer ring for example. It is also possible to have the outer ring made of ceramics and to utilize its low thermal conductivity, in which case the inner ring is then made of metal or another ceramic material.

In another preferred embodiment, the outer ring is connected to the inner ring in a connecting region in such a manner that the outer ring and the inner ring are capable of being moved toward each other in radial direction. Within the scope of thermal expansion, the outer ring can move radially away from the inner ring. However, movement between outer and inner ring is not possible in axial nor in circumferential direction. In addition to the thermal disconnection, relative movement between outer and inner ring is made possible in this way, said movement taking into consideration the expansion with temperature of the outer ring. The connection between outer ring and inner ring is devised in such a manner that the radial expansion with temperature is made possible. An example of a construction has already been given herein above, the intermeshing of fingers and pockets not only providing a thermal disconnection but also permitting radial movement.

In another preferred embodiment, at least two brake disks are provided and the hub consists of at least two hub portions. Each brake disk is allocated one hub portion. The hub portions are solidly connected to form one whole hub. The division into hub portions facilitates the manufacturing of the hub. The hub portions can be made by stamping for example, which is not so easy to carry out for the hub as a whole.

The internal surface and the mating external surface preferably are given a shape that can be obtained in one lathing step, which makes precision work between the two parts possible. Lathe works of this type are described in EP 97 346 B for example.

In a development, the disk brake unit is inserted into a bearing and disk brake unit. Said unit has a drag bearing which is fastened by means of at least an upper and a lower holding device. The drag bearing constitutes a one-piece cylinder of a cylinder and piston unit. This saves the steps of manufacturing and mounting. Additionally, and irrespective of a subsequent assembly, the axis of the cylinder is parallel to the rotational axis, the accuracy is merely determined by the accuracy with which the drag bearing has been manufactured.

In another improvement, the bearing and disk brake unit has brake pads which are arranged on either side of the at least one friction ring. The brake pads are actuated by the piston of the piston and cylinder unit. The brake pads have guide means for the holding and guiding thereof. They are arranged parallel to the rotational axis and slidable along guide ways. Said guide ways are formed on a guide arm that is configured integral with the drag bearing. It projects in the direction of the rotational axis of the drag bearing and extends over at least one brake disk which it covers on the outside. Brake pads are slidably retained on its guide ways.

The one-piece connection of the guide arm with the remaining drag bearing permits to simplify manufacturing and assembly, the parallel orientation of the guide ways relative to the cylinder's axis and to the rotational axis is improved, the reaction forces of braking are better directed into the drag bearing. Maintenance is also facilitated. Worn brake pads are more easily replaced and new ones easier to attach.

In another improvement an end piece, which is detachably attached to the free end of the guide arm, only needs to be unscrewed for performing assembly steps on the brake pads. Said end piece is located directly within the force path of the piston of the cylinder and piston unit. It transmits the reaction forces of braking onto the guide arm.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

The invention will now be further described, by way of example, with reference to the accompanying drawings, in which FIG. 1 is a perspective view in the form of an assembly drawing of a bearing and disk brake unit;

FIG. 2 is a perspective view in another viewing direction but still in the form of an assembly drawing of the unit according to FIG. 1;

DETAILED DESCRIPTION OF THE PREFERRED EMBODIMENTS

Figure 3:
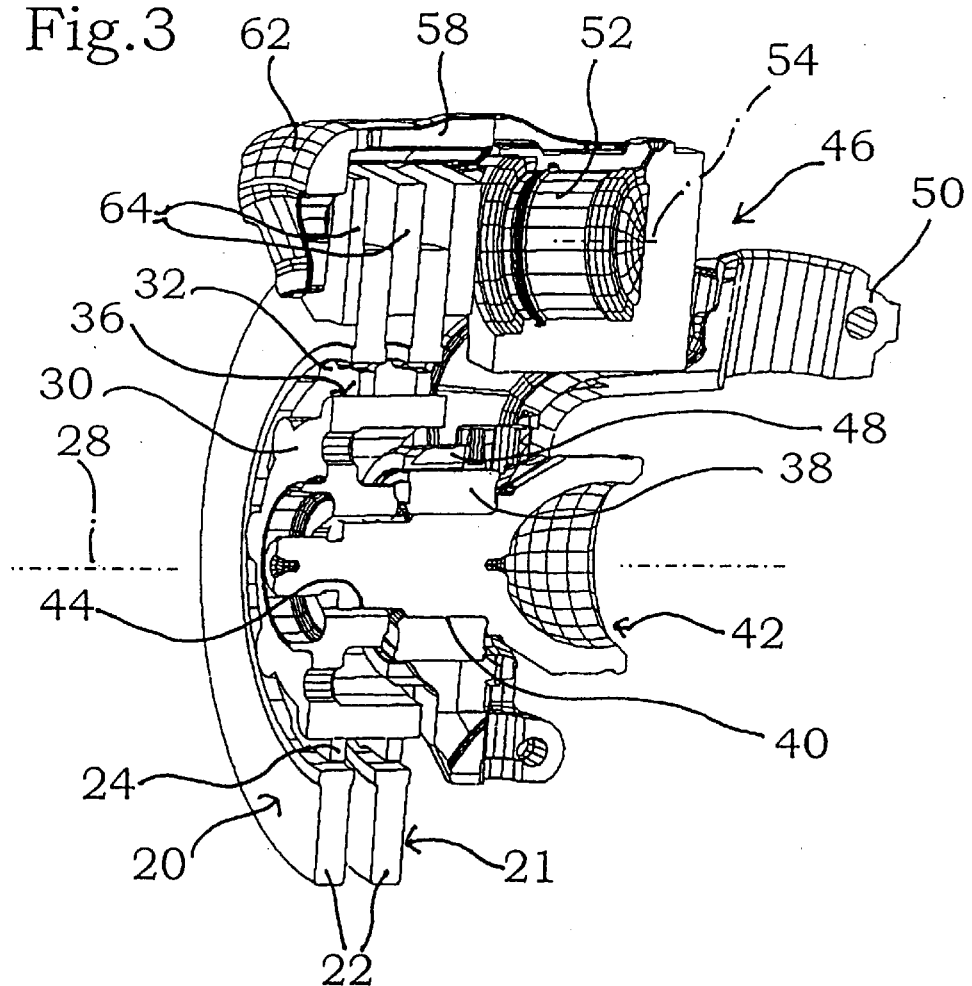
FIG. 3 is a perspective sectional view with a cutting plane defined by the rotational axis of the hub and the cylinder's axis of the cylinder and piston unit.
Figure 4:
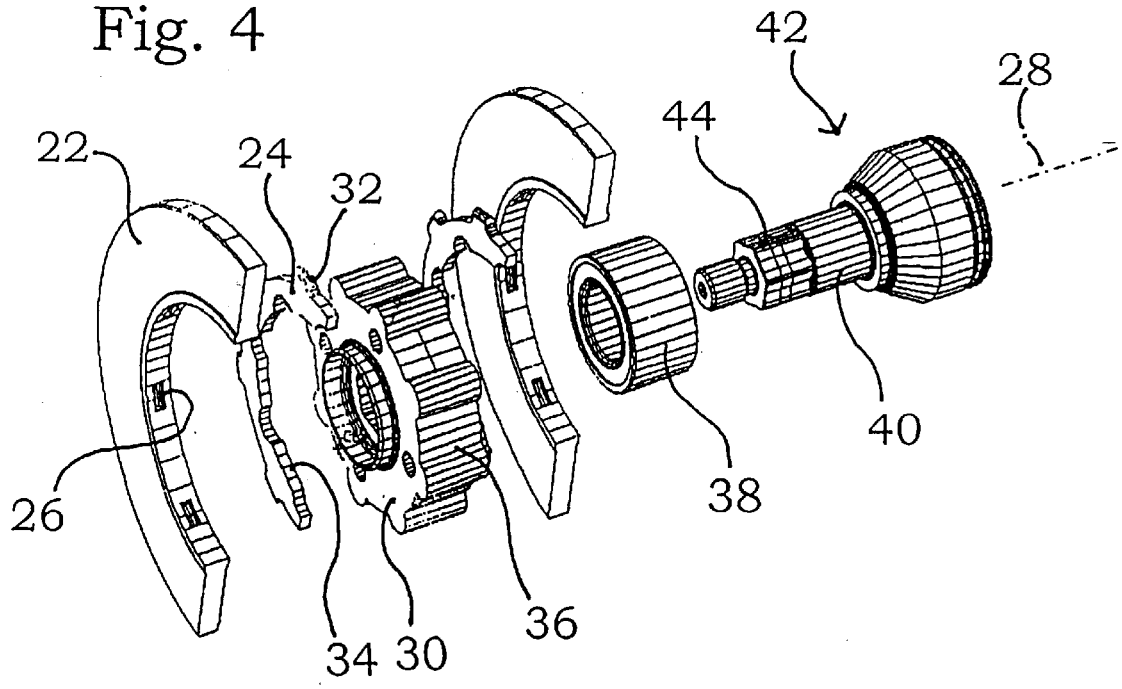
FIG. 4 is a perspective assembly drawing in the form of a detail taken from the complete unit illustrating two brake disks, one hub, one wheel bearing and one external joint, again in the form of an assembly drawing.
Figure 5:
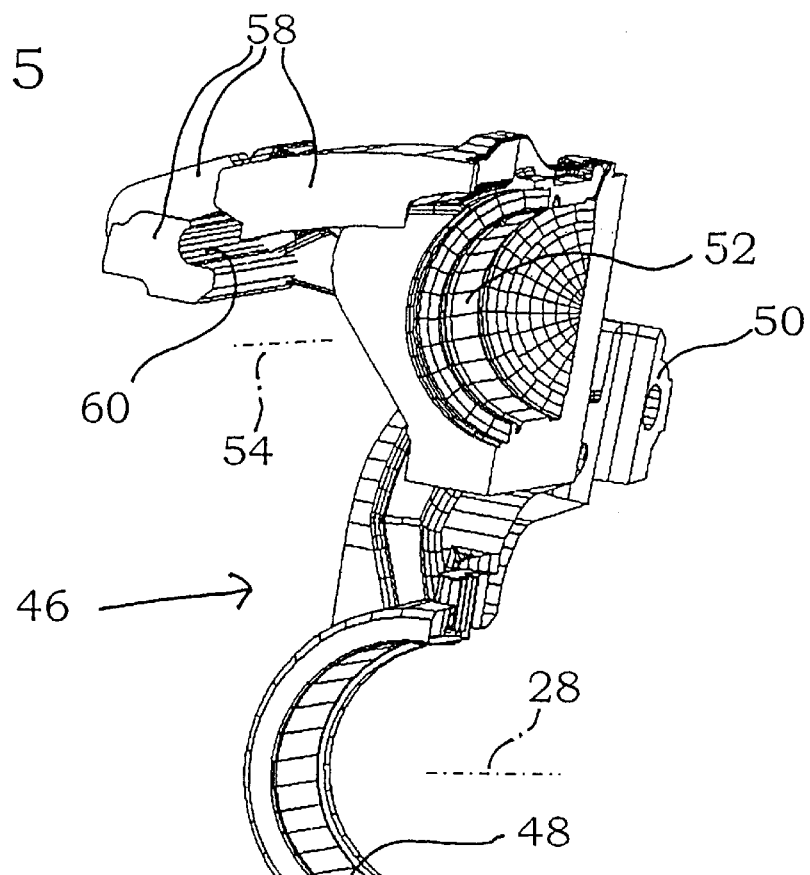
FIG. 5 is a perspective sectional view of a drag bearing, the cutting plane being again defined by the rotational axis and the cylinder's axis of the cylinder and piston unit.

The bearing and disk brake unit shown in the FIGS. 1 through 5 has two brake disks 20, 21 that are built according to the same principle. Each of them is comprised of an outer ring 22 and of an inner ring 24. The outer ring 22 is substantially configured as a friction ring, in the embodiment of concern it is made of metal. Another material is possible. On its inner surface it has pockets 26 which are open to the inside and extend in radial direction. The radial direction refers to a rotational axis 28 which is shown in dash-dot line in the Figures. It is the rotational axis of a wheel which is not illustrated herein and can be attached to a hub 30 which is provided for this purpose with receiving holes for wheel studs. The terms axial, radial and in circumferential direction refer to said rotational axis 28.

Fingers 32 project radially outward from the inner ring 24. Said fingers 32 are dimensioned in such a manner that they mesh with the pockets 26. They fill them up in cross section. As a result thereof, inner ring 24 and outer ring 22 are solidly joined together both in circumferential and in axial direction. In radial direction, the outer ring 22 can move away from the inner ring 24. This occurs when the outer ring 22 is heated by braking and expands outward. The EP 01 102 314.0 is incorporated into this disclosure by reference.

The inner ring 24 forms an internal surface which is non circular. In the embodiment of concern, it is substantially bounded by a cylinder which additionally has eight semi-circular recesses. Said recesses form inner dogs.

The hub 30 has an external surface 36 which has, in axial direction, the same shape as the internal surface 34, it has outer dogs. As a result thereof, the inner ring 24 accurately fits the hub 30. The inner ring 24 can be displaced in axial direction relative to the hub 30, movement in circumferential or in radial direction however is not possible. A wheel bearing 38 is located on the same axis as the hub 30 and in the immediate proximity thereof. In the assembled condition of the unit, said wheel bearing is seated on a bearing face 40 of an external joint 42. Said joint has a non circular region 44 with a trochoidal cross section which is axially offset relative to the bearing face 40. An inner recess of the hub 30 has a mating cross section. In this way, the hub is non-rotatably connected to the external joint 42.

A drag bearing 46 forms a wheel carrier 48; FIG. 3 shows the wheel bearing 38 in an assembled condition. The drag bearing has several holding devices 50 for the fastening thereof. The drag bearing 46 furthermore has a region that is configured integral with said bearing and in which a cylinder 52 of a cylinder and piston unit is arranged. The cylinder's axis 54 is parallel to the rotational axis 28. A piston 56 is slidably guided in said cylinder 52.

In immediate proximity to the piston and on its side which is turned away from the rotational axis 28, a guide arm 58 projects in one piece from the drag bearing 56. In its assembled condition it covers the brake disks 20, 21, compare FIG. 3. It forms two guide ways 60 that are facing each other inside thereof, said guide ways having an almost circular cross section but being open on the side by which they face each other.

The guide arm 58 has a free end. In the assembled condition, an end piece 62 is placed onto said free end. Said end piece is connected thereto by way of two lateral studs engaging into threaded blind holes (not shown) of the guide arm 58. The threaded blind holes are oriented parallel to the rotational axis 28.

Altogether three brake pads 64 are provided, said brake pads receiving between them the outer rings 22 of the brake disks 20 and 21. The brake pads 64 have two guide means 66 each which are configured as lugs pointing toward each other in opposite directions. They engage in the guide ways 60. The brake pads 64 are retained by the guiding means 66 and can be displaced within the guide ways 60, parallel to the rotational axis 28.

Figure 6:
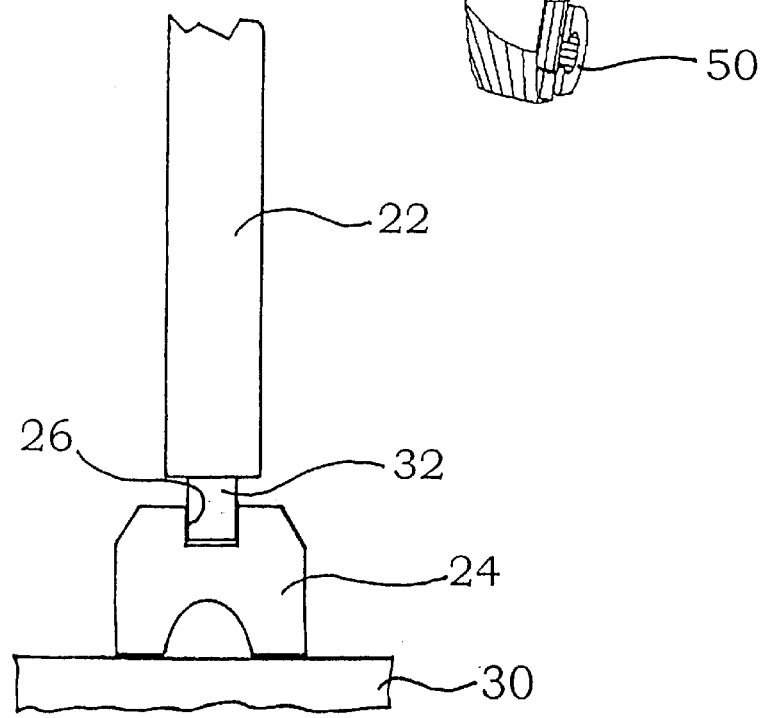
FIG. 6 is a sectional view in a radial plane of a second embodiment of the brake disk with hub.

FIG. 6 is a diagrammatic view of an inner ring 24 made of ceramics. It has pockets 26 extending radially inward from the outside region of the inner ring 24. The outer ring 22 is made of metal by a compound casting method. As a result thereof, its fingers 32 fill up the pockets 26. The inner ring has a recess, which reduces the contact surface of the hub 30.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words and description rather than of limitation.

We claim:

1. A disk brake unit for a vehicle wheel comprising:
    a hub having a rotational axis, the hub including an external surface having outer dogs; and
    a first brake disk having an inner ring and an outer ring that are non-rotataby linked, the outer ring having a friction ring, the inner ring including an internal surface having inner dogs adapted to contact the external surface of the hub such that the first brake disk is slidable in the direction of the rotational axis but solidly connected to the hub in a circumferential and radial direction, and the first brake disk including a means to prevent heat from being transmitted from the friction ring of the outer ring to the internal surface of the inner ring, the means being arranged between the friction ring and internal surface and including the inner ring being made from a material with very low thermal conductivity.

2. The disk brake unit of claim 1, wherein one ring of the inner and outer rings includes fingers extending radially and another ring of the inner and outer rings includes pockets which are radially accessible and adapted to engage the fingers in such a manner that radial movement between fingers and pockets is permitted, while circumferential and axial movement between the fingers and pockets is restricted.

3. The disk brake unit of claim 1, wherein the outer ring is connected to the inner ring in a connecting region such that, within a scope of thermal expansion, the outer ring can move radially away from the inner ring, wherein relative movement between outer ring and inner ring is restricted in an axial and circumferential direction.

4. The disk brake unit of claim 1, further comprising a second brake disk wherein the hub includes at least two hub portions, a first hub portion being assigned to the first brake disk and a second hub portion being assigned to the second brake disk wherein the first and second hub portions are solidly connected together to form one complete hub.

5. The disk brake unit according to claim 1, further comprising a drag bearing having at least one holding device for fastening the drag bearing and the drag bearing having a cylinder of a cylinder and piston unit.

6. The disk brake unit of claim 5, further comprising a brake pad located adjacent to the friction ring, the brake pad is attached to a piston of the cylinder and piston unit, the brake pad is provided with a guiding means and is arranged so as to be slidable parallel to the rotational axis, and the drag bearing is provided with a guide arm which is configured integral with the drag bearing and extends substantially in the direction of the rotational axis forming guide ways which cooperate with the guiding means of the brake pad.

7. The disk brake unit of claim 6, wherein the guide arm has a free end, and an end piece is detachably mounted onto the free end of the guide arm.

8. The disk brake unit of claim 5, wherein the drag bearing includes a wheel carrier which receives a wheel bearing, and an external joint positioned within the wheel bearing, wherein the hub is fastened to the external joint in such a manner that it is separated from and axially offset relative to the wheel bearing.

9. The disk brake unit of claim 8, wherein the external joint has a receiving surface for the wheel bearing and a non-circular region with a trochoidal shaped cross section axially offset relative to the receiving surface wherein the external joint is connected to the hub.

10. A disk brake unit for a vehicle wheel comprising:
    a hub having a rotational axis, the hub including an external surface having outer dogs;
    a first brake disk having an inner ring and an outer ring that are non-rotataby linked, the outer ring having a friction ring, the inner ring including an internal surface having inner dogs adapted to contact the external surface of the hub such that the first brake disk is slidable in the direction of the rotational axis but solidly connected to the hub in a circumferential and radial direction, and the first brake disk including a means to prevent heat from being transmitted from the friction ring of the outer ring to the internal surface of the inner ring, the means being arranged between the friction ring and internal surface;
    a drag bearing having at least one holding device for fastening the drag bearing and the drag bearing having a cylinder of a cylinder and piston unit; and
    wherein the drag bearing includes a wheel carrier which receives a wheel bearing, and an external joint positioned within the wheel bearing, wherein the hub is fastened to the external joint in such a manner that it is separated from and axially offset relative to the wheel bearing.

11. The disk brake unit of claim 10, wherein the external joint has a receiving surface for the wheel bearing and a non-circular region with a trochoidal shaped cross section axially offset relative to the receiving surface wherein the external joint is connected to the hub.

* * * * *

UNITED STATES PATENT AND TRADEMARK OFFICE
CERTIFICATE OF CORRECTION

PATENT NO. : 6,712,185 B2
DATED : March 30, 2004
INVENTOR(S) : Markus O. Wallentin et al.

It is certified that error appears in the above-identified patent and that said Letters Patent is hereby corrected as shown below:

<u>Column 5,</u>
Line 48, delete "non-rotataby" and substitute -- non-rotatably -- in its place.

Signed and Sealed this

Thirty-first Day of August, 2004

JON W. DUDAS
*Director of the United States Patent and Trademark Office*